United States Patent [19]
Chee

[11] Patent Number: 5,528,669
[45] Date of Patent: Jun. 18, 1996

[54] SINGLE CASSETTE ANSWERING MACHINE WITH DUAL PHONE LINE AND MAILBOX FEATURES

[75] Inventor: Henry T. Chee, Kowloon, Hong Kong

[73] Assignee: Kingtronics Industrial Co., Ltd., Kowloon, Hong Kong

[21] Appl. No.: 271,348

[22] Filed: Jul. 6, 1994

[51] Int. Cl.$^6$ .................................................. H04M 1/65
[52] U.S. Cl. ............................. 379/73; 379/70; 379/68; 379/77
[58] Field of Search ........................... 379/68, 73, 74, 379/77, 165, 70; 369/29, 34

[56] References Cited

U.S. PATENT DOCUMENTS

| | | |
|---|---|---|
| 3,728,487 | 4/1973 | Hata . |
| 3,730,997 | 5/1973 | Konno . |
| 3,931,470 | 1/1976 | Zimmermann . |
| 3,967,068 | 6/1976 | Shinohara . |
| 4,011,411 | 3/1977 | Nishimura . |
| 4,122,306 | 10/1978 | Friedman et al. ........................ 379/77 |
| 4,194,089 | 3/1980 | Hashimoto ............................... 379/73 |
| 4,515,995 | 5/1985 | Bolick, Jr. et al. ....................... 379/73 |
| 4,591,664 | 3/1986 | Freeman .................................. 379/212 |
| 4,616,109 | 10/1986 | Chee . |
| 4,626,631 | 12/1986 | Hanscom ................................. 379/165 |
| 4,640,990 | 2/1987 | Kawade et al. .......................... 379/77 |
| 4,747,126 | 5/1988 | Hood et al. . |
| 4,811,383 | 3/1989 | Hashimoto ............................... 379/77 |
| 4,847,889 | 7/1989 | Eswaran ................................... 379/77 |
| 4,951,307 | 8/1990 | Willard .................................... 379/77 |
| 5,050,206 | 9/1991 | Shimanuki ............................... 379/77 |
| 5,159,626 | 10/1992 | Baum et al. ............................. 379/82 |

OTHER PUBLICATIONS

"TAD 252 Telephone Answering System Owner's Manual" 1987.

Primary Examiner—Jeffrey Hofsass
Assistant Examiner—Daniel S. Hunter
Attorney, Agent, or Firm—Jordan and Hamburg

[57] ABSTRACT

An answering machine has a single tape for recording phone messages wherein messages are recorded on at least two tracks. The answering machine optionally includes a voice synthesis system for generating announcement messages and a microphone for recording announcement messages and monitoring audio events either over a phone line or via a recording. Recordings on each track are executed in the same direction. In one embodiment of the invention, a first track accepts messages received without requiring that a code be transmitted. Messages are recorded on a second track in a mailbox mode of operation only when a predetermined mailbox code is received. A second embodiment includes inputs for two phone lines. The first tape track is dedicated to a first phone while the second track is dedicated to the second phone line. A third embodiment further includes the capability to record on third and fourth tracks which function as mailbox tracks for respective ones of the first and second tracks. Various modes of remote operation are initiated by a transmission of appropriate touch tone codes.

8 Claims, 6 Drawing Sheets

SINGLE CASSETTE ANSWERING MACHINE WITH DUAL PHONE LINE AND MAILBOX FEATURES

BACKGROUND OF THE DISCLOSURE

The present invention relates to an improved single cassette answering machine, and is more particularly directed to an answering machine supporting mailbox, dual phone line, and room monitoring operations wherein tape tracks are independently recorded upon in a single direction.

Conventional answering machines accept incoming phone calls over a single phone and allow a caller to leave a message on a recording tape. Such systems may include either one or two cassette tapes. Where two cassette tapes are employed, one tape is used for playing an announcement message, while the other accepts recordings of the incoming phone cabs. The use of dual cassette tapes increases the cost and complexity of the system. Single tape mechanisms first play the announcement message located at a predetermined location on the tape and then must fast forward to a location on the tape at an end of the last recorded incoming message. The fast forwarding operation delays recording the incoming message and forces the caller to wait until a ready indicator is generated.

Conventional answering machine systems do not provide a method for an incoming caller to segregate messages. All incoming messages are recorded in sequence and are generally erased as a whole after playback of the messages. This operation does not permit a user to playback specific types of calls which are of distinct significance, for example, business calls, as opposed to general personal calls. Thus, the user must filter through all the calls in order to extract the recorded business calls.

Answering machines typically employ standard cassette drive mechanisms which record on a first side of a tape when the tape is inserted in a first orientation, and on a second side of the tape when the tape is installed in a reverse orientation from that of the first orientation. The first and second sides are, thus, recorded in opposing directions. This type of operation is conventional and is used in most commercial tape recorders. Thus, a tape removed from the typical answering machine may be replayed on any commercial tape recorder. This permits the security of the information on the tape to be easily breached Message recording systems also exist which implement "voice mail" operations, wherein a caller enters a touch tone code to store a message directed to a particular individual assigned to a "mailbox" where the message is stored. Such a system is disclosed in U.S. Pat. No. 4,747,126. The messages are stored in either a digital memory or on a tape system. The caller is prompted to enter a code associated with a particular mailbox after which the system awaits the code's entry before proceeding. Entry of the code requires that the caller be using a touch tone phone to generate the requisite tones. Therefore, the caller must enter a recognized code in order to store his or her message. Operation of such a system is sometimes difficult or impossible where a user is unfamiliar with the technology involved or a touch tone phone is unavailable. Furthermore, such systems restrict the length of record messages requiring a caller to call back to record additional information.

OBJECTS AND SUMMARY OF THE INVENTION

Accordingly, it is an object of the invention to provide an answering machine which overcomes the drawbacks of the prior art.

It is a further object of the invention to provide a single tape answering machine having a voice mail feature implemented in conjunction with a conventional answering operation.

It is a still further object of the invention to provide an answering machine which can record incoming messages with minimal delay after an announcement message is played.

It is yet another object of the invention to provide a single tape answering machine capable of recording calls arriving over two phone lines in a segregated manner corresponding to the respective phone lines.

An object of the present invention is to provide a single tape answering machine which records phone messages in a format incompatible with typically available tape players.

Briefly stated, the present invention provides an answering machine having a single tape for recording phone messages wherein messages are recorded on at least two tracks. The answering machine optionally includes a voice synthesis system for generating announcement messages and a microphone for recording announcement messages and monitoring audio events either over a phone line or via a recording. Recordings on each track are executed in the same direction. In one embodiment of the invention, a first track accepts messages received without requiring that a code be transmitted. Messages are recorded on a second track in a mailbox mode of operation only when a predetermined mailbox code is received. A second embodiment includes inputs for two phone lines. The first tape track is dedicated to a first phone line, while the second track is dedicated to the second phone line. A third embodiment further includes the capability to record on third and fourth tracks which function as mailbox tracks for respective ones of the first and second tracks. Various modes of remote operation are initiated by a transmission of appropriate touch tone codes.

In accordance with these and other objects of the invention, there is provided an apparatus for answering phone cabs and recording messages on a single tape comprising a controller; an interface device for interfacing with a phone line and the controller, responsive to phone line conditions and the controller; a recording device responsive to the controller for recording messages on a first and a second track of the single tape; and an announcement device responsive to the controller for generating an announcement message. The controller includes a device for sending the announcement message out over the phone line in response to a predetermined number of ring signals indicated by the interface device. The controller includes a device for actuating the recording device to record a phone message, received over the phone line, on the second track in response to receiving a predetermined code received over the phone line. The controller includes a device for actuating the recording means to record the phone message on the first track in response to passage of a first predetermined time period without a receipt of the predetermined code received over the phone line. The controller includes a device for terminating recording responsive to one of an indication of termination of the phone message and a passage of a second predetermined time period.

The present invention also provides an apparatus for answering phone calls and recording messages on a single tape comprising a controller; an interface device for interfacing with a first and a second phone line and the controller, responsive to phone line conditions and the controller; a recording device responsive to the controller for recording messages received over the first phone line on a first track of the single tape, and recording messages received over the second phone line on a second track of the single tape; and an announcement device responsive to the controller for generating an announcement message. The controller device including a device for selectively sending the announcement message out over one of the first and second phone lines in response to a predetermined number of ring signals indicated by the interface device. The controller including a device for actuating the recording device to record a phone message, received over one of the first and second phone lines, on one of the first and second tracks, respectively. The controller including a device for terminating recording responsive to one of an indication of termination of the phone message and a passage of a predetermined time period.

The present invention also includes the above embodiments wherein, in the alternative, various implementations of features of the above embodiments are incorporated. For example, in the above embodiment having inputs for two phone lines, a further embodiment provides a dual phone line answering machine having a mailbox feature further comprising the recording device further including a device for recording messages on a third and a fourth track of the single tape. The controller including a device for actuating the recording device to record a phone message on the third track in response to receiving a first predetermined code received over the first phone line, and on the fourth track in response to receiving a second predetermined code received over the second phone line. The controller including a device for actuating the recording device to record the phone message on the first track in response to passage of a second predetermined time period without a receipt of the first predetermined code received over the first phone line, and on the second track in response to passage of the second predetermined time period without a receipt of the second predetermined code received over the second phone line.

The present invention also includes the above embodiments wherein, the device for generating an announcement includes a digital voice storage and synthesis circuit. Additionally, a microphone is provided for recording messages and monitoring audio events remotely over the phone line or by recording the audio events. Furthermore, the controller includes programming for the execution of a variety of other remotely control operations.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1A:
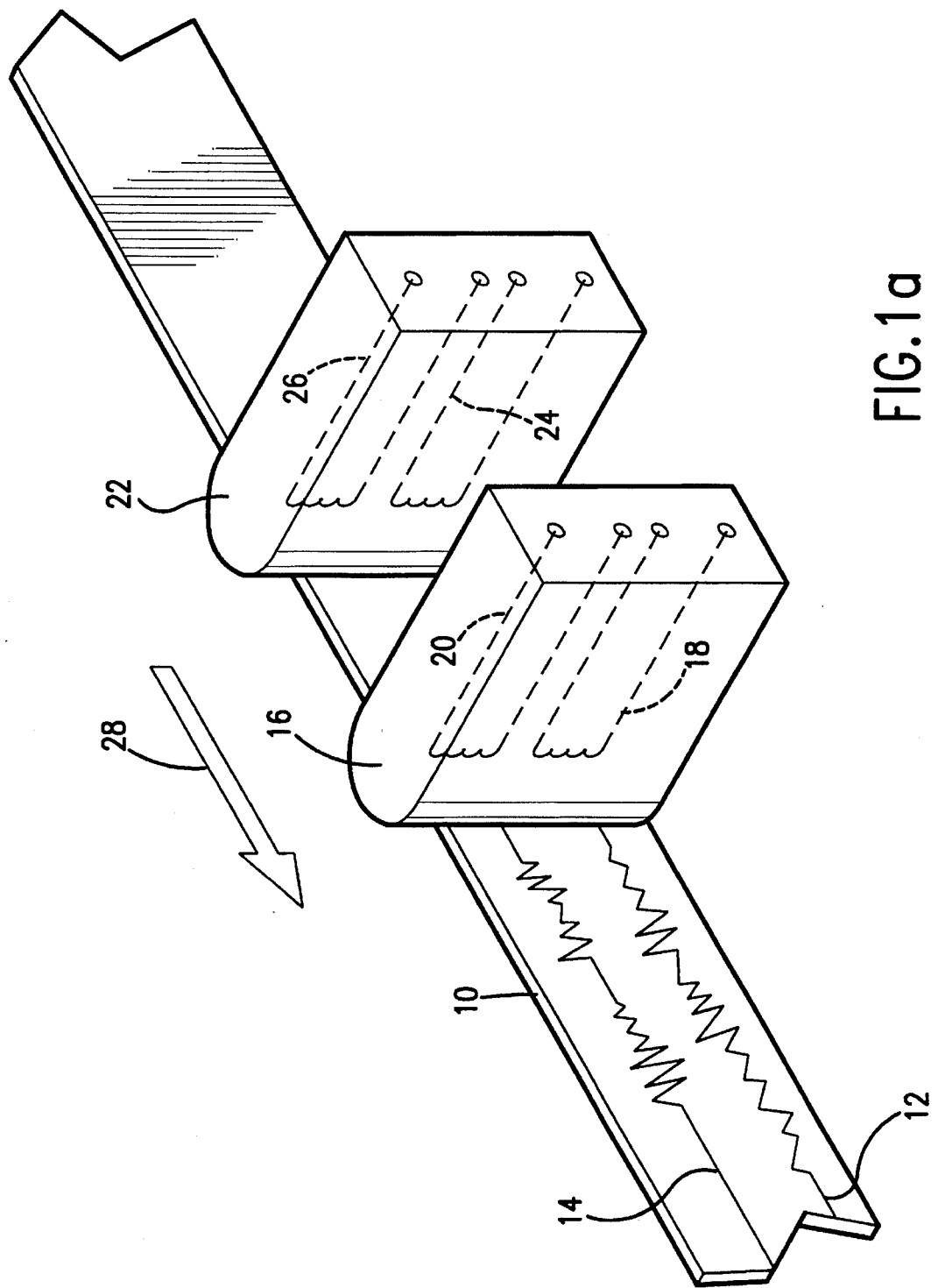
FIG. 1a is a simplified drawing of a tape track and tape head arrangement of the present invention.

Referring to FIG. 1a, there is shown a recording track and head arrangement of an answering machine of the present invention. A magnetic tape 10 has a first track 12 and a second track 14 arranged adjacent one another. The magnetic tape 10 is of a standard configuration typically used in tape cassettes or micro-cassettes. A record and playback (R/P) head 16 has first and second record and playback (R/P) coils, 18 and 20, aligned respectively with the first and second tracks, 12 and 14. An erase head 22 includes first and second erase coils, 24 and 26, for erasing information recorded on the respective first and second tracks, 12 and 14.

In order to record on the first track 12, the magnetic tape 10 is driven in a first direction 28 by a tape drive mechanism (not shown). The first R/P coil 18 is driven with an audio signal, generated by an electronic assembly described below, to effect recording of the audio signal on the first track 12. Recording on the second track 14 is similarly accomplished by driving the second R/P coil 20 with an audio signal while the magnetic tape is also driven in the first direction 28. The first and second R/P coils, 18 and 20, are driven independently so that the first and second tracks, 12 and 14, can be recorded upon at differing times and locations along the tracks independent of recordings on the other tracks.

In a conventional tape recording mechanism, information is recorded in an opposite direction on a second track from that of information recorded on a first track. The present invention records information in the first direction 28 on both the first and second tracks, 12 and 14. Therefore, information recorded on the second track 14 cannot be played back on a conventional tape recorder because the information would be unintelligible due to attempting reproduction in a reversed sequence. This unconventional recording arrangement provides a measure of security for information recorded on the second track 14. The information on the second track 14 can only be reproduced on a machine of similar construction. Therefore, a person obtaining unauthorized possession of the tape 10, without also obtaining the answering machine, is impeded from retrieving the information on the second track 14. Additionally, the answering machine may optionally include a security mechanism for preventing playing of the second track 14 unless a personal identity number (PIN) is first entered.

The tape 10 is illustrated having two tracks, however, the number of tracks may be increased in alternative embodiments of the present invention. In such embodiments the number of R/P coils in a record and playback head may be increased to be commensurate with the number of tracks or, alternatively, a positioning apparatus may be employed to align a single coil record and playback head with a desired track. Similar constructions are applicable to an erase head in such embodiments.

Figure 1B:
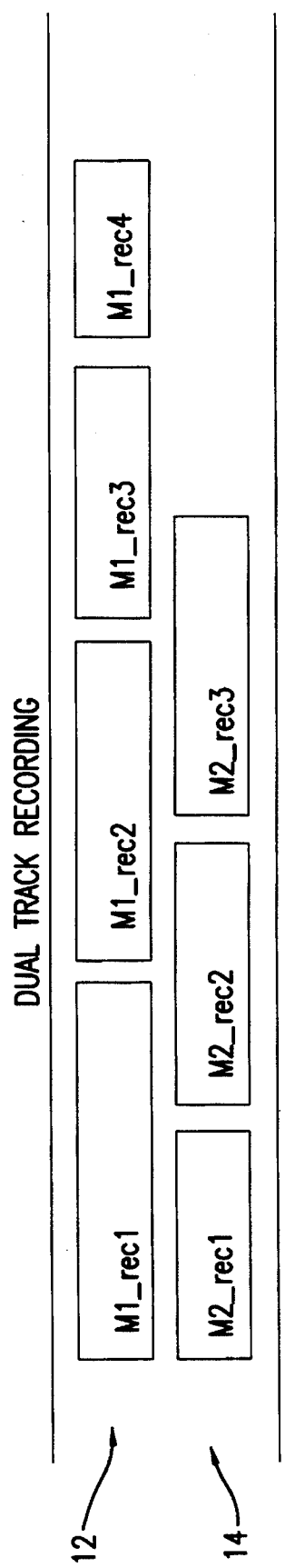
FIG. 1b is a diagram showing an arrangement of recorded messages.

Referring to FIG. 1b, an arrangement of recorded messages on the tape 10 is illustrated. Since each track is record independent of the other, the messages M1 of recording 1–4 need not be synchronized with the messages M2 of recordings 1–3. Furthermore, the messages need not be restricted in length as they do not have to coincide with a predetermined pattern.

Figure 2:
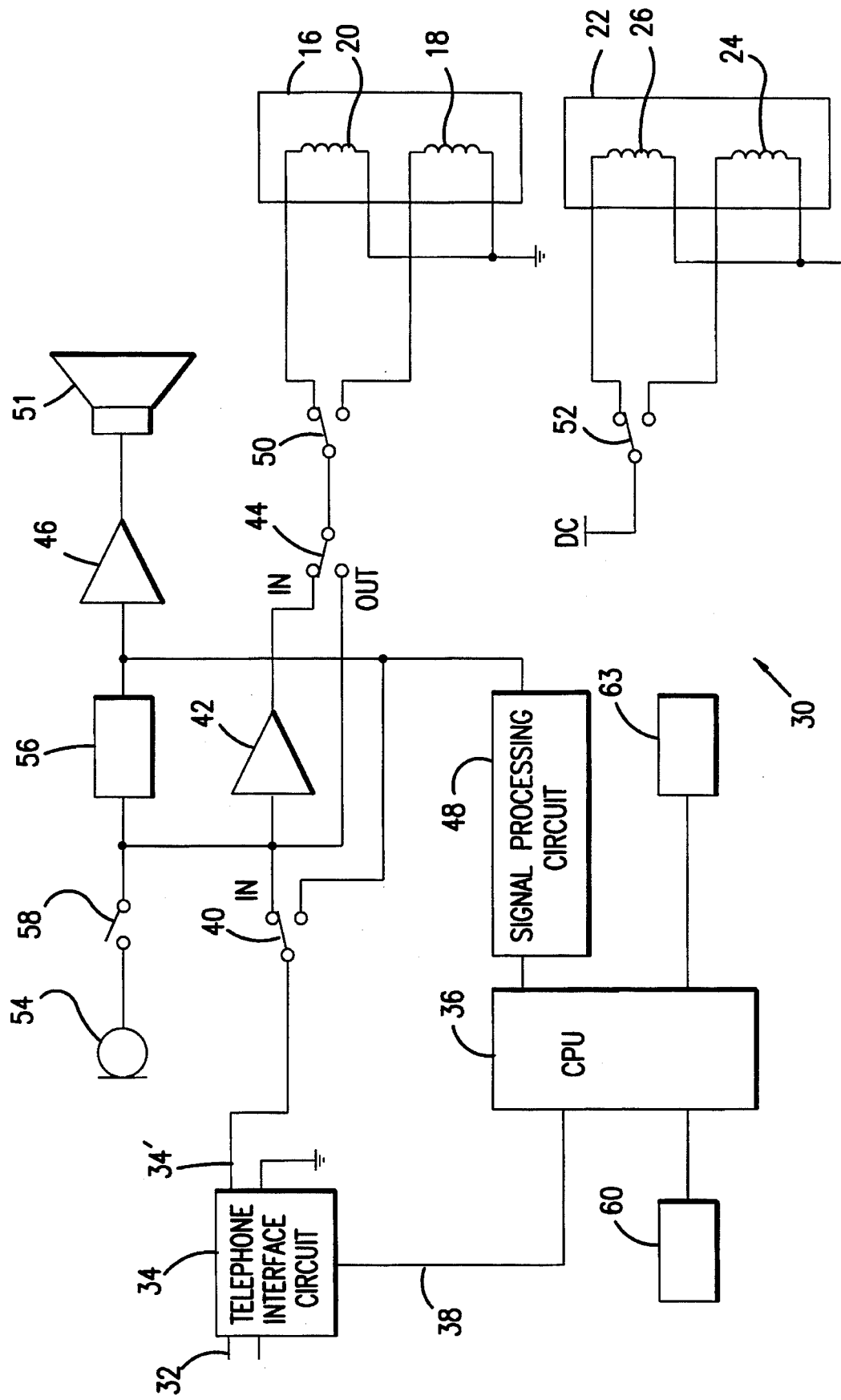
FIG. 2 is a schematic diagram of an electronic assembly of an embodiment of the present invention.

Referring to FIG. 2, a schematic of an electronic assembly 30 of a first embodiment of the present invention is shown. The electronic assembly 30 has a central processing unit (CPU) 36 programmed to implement a mailbox mode of operation described below. A phone line 32 is interfaced with a telephone interface circuit 34. The telephone interface circuit 34 performs necessary interface functions dictated by the requirements of the phone system. For example, the telephone interface circuit 34 provides the proper DC voltage levels, isolation, protection circuitry, and signal levels required for interfacing to the phone line 32. A bus 38 connects the telephone interface circuit 34 to the CPU 36 which has a memory (not shown) suitable for storing a system program described below. The telephone interface circuit 34 sends signals over the bus 38 indicating ring signal detection, branch phone detection, and other phone line status signals required for operation.

A first switch 40, operable by the CPU 36, selectively connects an I/O port 34' of the telephone interface circuit 34 with either an input or an output of an amplifier 42, when in respective IN and OUT positions, dependent upon whether an incoming or outgoing message is being transmitted. For instance, if an announcement message is being sent out over the phone line 32, the first switch 40 is set to the OUT position connecting the I/O port 34' of the telephone interface circuit 34 with the output of the amplifier 42. Similarly, if an incoming message is being recorded, the first switch 40 is set to the IN position connecting the I/O port 34' of the telephone interface circuit 34 with the input of the amplifier 40.

The output of amplifier 42 is coupled to a second switch 44, a power amplifier 46, and a signal processing circuit 48. The second switch 44 is set in conjunction with the first switch 40 to corresponding IN and OUT positions, permitting the amplifier 42 to handle both incoming and outgoing messages. The second switch 44 is connected to an R/P coil selection switch 50 which is used to select either the first or second R/P coil, 18 and 20, of the R/P head 16. While the amplifier 42 and the power amplifier 46 are shown as separate entities, other embodiments of the present invention can include a solid state circuit integrating both units upon a single chip to provide for size and cost reduction.

In a recording mode of operation, the CPU 36 sets the R/P coil selection switch 50 to select one of the first and second R/P coils, 18 and 20, and sets the first and second switches, 40 and 44, to their respective IN positions, applying an output from the amplifier 42 to the R/P coil selection switch 50 to record incoming calls. Alternatively, in a playback mode of operation, the CPU 36 sets the first and second switches, 40 and 44, to their respective OUT positions to connect the R/P coil selection switch 50 with the input of the amplifier 42. The output of the amplifier 42 is hard-wired to an input of the power amplifier 46. A recorded message is thereby reproduced by a speaker 51 driven by an output of the power amplifier 46. The amplifier 42 has automatic gain control circuitry for producing an output signal level having an appropriate level for either recording or playback operation.

An erase coil switch 52 is operated by the CPU 36 to selectively apply a DC erasing signal to one of the first and second erase coils, 24 and 26. The erase coils, 24 and 26, are driven during both erasing operations for removing all information from a given one of the first and second tracks 12 and 14 or, during a record operation, to erase information from a selected one of the first and second tracks, 12 and 14, prior to a corresponding one of the R/P coils, 18 and 20, recording information on the selected track.

A system I/O assembly 60 interfaces with the CPU 36 and includes control switches and display devices (both not shown). The control switches can include simple switches for setting modes of operation or a keypad permitting the input of numeric or alphanumeric information. The keypad permits a user to enter his personal identity number, in order to playback messages when the security option is included, in addition to other security codes for implementing remote operation. The display devices may include LCD or LED alphanumeric displays, and LED annunciators for indicating a given status of operation.

A microphone 54 is selectively connected to a voice storage and synthesis circuit 56 by a microphone engagement switch 58 for digitally recording outgoing messages. The voice storage and synthesis circuit 56 digitizes analog signals produced by the microphone 54 and stores them in a memory (not shown). The voice storage and synthesis circuit 56 also supports the optional feature of a date and time stamp. A clock and calendar function is incorporated into the CPU 36 for maintaining a current time and date in the memory of the CPU 36. An audio signal carrying the date and time is generated by the voice storage and synthesis circuit 56 and recorded at the end of incoming messages. Additionally, the voice storage and synthesis circuit 56 can support menu driven operation.

The output of the microphone engagement switch 58 is also connected to the input of the amplifier 42 permitting a user to record messages on one of the first and second tracks, 12 and 14, of the tape 10. The microphone 54 is also used for room monitoring. The first and second switches, 40 and 44, are set to their respective IN positions for recording. Audio events, occurring in a room where the answering machine is located, are then recorded and can later be played back. Alternatively, it is also possible for the signals produced by the microphone 54 to be sent out over the phone line 32 by the telephone interface circuit 34 when the first and second switches are set to a playback mode state. This permits the events in a room to be remotely monitored over the phone line 32. The monitoring function is initiated manually by switches of the system I/O assembly or remotely by a transmission of a remote monitoring command from a touch tone phone. One such remote monitoring instructs the CPU 36 to record the events on a selected one of the first and second tracks, 12 and 14, until a cancellation command is sent. Another form of remote monitoring command instructs the CPU to transmit the audio events over the phone line until the caller hangs up.

A tape drive assembly 62 interfaces with the CPU 36. The tape drive assembly includes a motor, a drive mechanism, and drive switching mechanisms (not shown) for effecting play, reverse and fast forward operations. Additionally, the tape drive assembly includes a sensor (not shown) for determining tape position permitting the CPU 36 to advance or rewind the tape 10 to a selected position for either playback or recording. The sensor may be either an optical, a magnetic, or an electro-mechanical encoding device. The sensor is coupled to a tape driving mechanism and produces pulses as the tape 10 is advanced or rewound. The CPU 36 counts the pulses and thus determines a tape position indicating a current position of the tape 10 relative to an initialization position which is preferably at a beginning of the tape. A tape end detector (not shown) senses when the tape 10 has been fully rewound, at which point the CPU 36 deactivates the tape driving mechanism and initializes a tape position count to zero. When a message is recorded on the tape 10, the CPU 36 monitors the tape position count and stores an end of message count in memory when recording of an incoming message is completed. This permits the CPU 36 to rapidly find a position on the tape 10 at the end of the last recorded message on either one of the first and second tracks, 12 and 14.

The signal processing circuit 48 also interfaces with the CPU 36. The signal processing circuit includes both VOX (voice operated control) and DTMF (dual tone multifrequency) decoding circuits (not shown). The VOX circuit permits the detection of various signals, both incoming and playback. For instance, the VOX circuit detects silence, voice signals, telephone supervisory tones, such as dial tones, special tones and noise. The DTMF circuitry provides for the decoding of remote control commands transmittable by touch tone phones.

Figure 3:
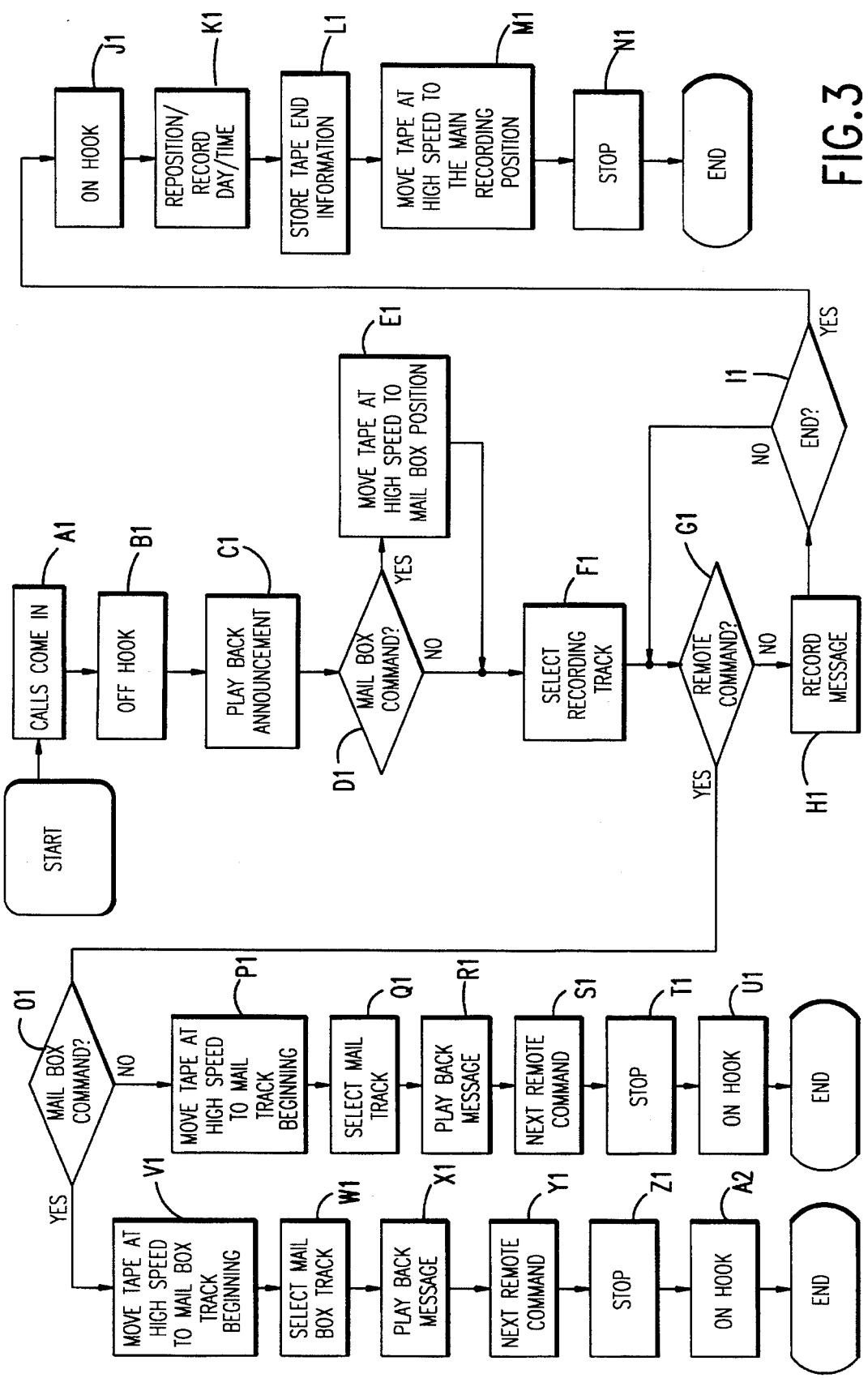
FIG. 3 is a flowchart of an embodiment of a program for controlling operation of the electronic assembly of FIG. 2.

Referring to FIG. 3, a flowchart details a program stored in the memory of the CPU 36 for operating the answering machine with the mailbox feature. When a telephone call arrives over the phone line 32 the telephone call is processed by the telephone interface circuit 34 which sends a message over the bus 38 to the CPU 36 indicating that a ring signal is being received (step A1). The CPU 36 proceeds to count a predetermined number of ring signals and then issues an OFF HOOK command to the telephone interface circuit 34 if a user does not answer the telephone call before the predetermined number of ring signals (step B1). The predetermined number of ring signals is either previously input by the user via the system I/O assembly 60 or is a preprogrammed default number of ring signals. Once the OFF HOOK command is issued, the telephone interface circuit 34 couples the phone line 32 with the I/O port 34'. The first and second switches, 40 and 44, are set to their respective OUT positions by the CPU 36 in preparation for delivering an announcement message stored in the voice storage and synthesis circuit 56. Simultaneously, input from the phone line 32 is applied to the signal processing circuit 48. The announcement message is then reproduced by the voice storage and synthesis circuit 56 in response to a command issued by the CPU 36 (step C1). The announcement message is previously recorded by the user and provides a caller with desired information for either leaving a message or, optionally, for using the mailbox feature.

Following the issuance of the announcement message, the CPU 36 sets first and second switches to their respective IN positions and monitors an output of the signal processing circuitry 48 for detecting an occurrence of a mailbox command (step D1). The mailbox command is generated by the caller, preferably, using a keypad of a touch tone telephone. The DTMF circuitry, of the signal processing circuitry 48, decodes tone bursts of the touch tone phone and transmits decoded information to the CPU 36 as discussed above.

Where the user intends the mailbox feature to be restricted to an authorized caller, no mention is made of the feature in the announcement message. Thus, the handling of an incoming call appears to be made by a conventional answering machine. In such instances, the mailbox command is a private identification number determined by the user. Whether public or private, the identification number is previously entered by the user via the system I/0 assembly 60 and stored by the CPU 36 for comparison with the decoded information from the DTMF circuitry of the signal processing circuitry 48.

When a mailbox command is received, the CPU 36 operates the tape drive assembly 62 to move the tape 10 at high speed to a position at an end of a last recorded mailbox message (step E1). This is accomplished by comparing the current tape position count with the end of message count stored in the memory of the CPU 36 indicating the end of the last recorded message on the second track 14. When a tape position count equaling the end of message count is reached, the CPU 36 terminates the high speed drive of the tape 10. The CPU then sets the R/P coil selection switch 50 to select the second R/P coil 20 for recording on the second track 14 dedicated to mailbox recordings (step F1). In the alternative, when no mailbox command is received after a predetermined time period the CPU 36 determines that a normal message, as oppose to a mailbox message, is to be left and recorded on the first track 12 (step D1). The tape 10 is normally maintained in a position corresponding to an end of a last recorded message on the first track 12, the track designated for use in normal mode operation.

It is realized that, while the tape position count provides an effective method for locating specific positions on the tape 10, there are occasions where the accuracy of such positioning may be affected by tape stretch and varying tightness of the wound tape. Therefore, once the end-of-message position count is reached, an additional procedure can be implemented wherein the CPU 36 advances the tape 10 a predetermined number of additional counts to ensure that a next recorded mailbox message does not overwrite an end of the last recorded mailbox message. Alternatively, another method is optionally provided to guard against overwriting. In this alternative method, the CPU 36 sets first and second switches, 40 and 44, to their respective OUT positions for reproducing recordings on the second track 14. The CPU then places the tape drive system 62 into a play mode and monitors the recording via the VOX circuitry of the signal processing circuit 48. The VOX circuitry indicates to the CPU 36 whether there is a recording present at a location currently being played or whether the tape 10 is blank at that location. Thus, the CPU 36 advances the tape 10 until the VOX circuitry indicates a blank has been reached. A blank area at the end of the last recorded message is ensured by purposely erasing a portion of the tape 10 following completion of the last recorded message during the prior activity.

Following the selection of the recording track, the CPU 36 initiates recording of an incoming message while monitoring the incoming message for a remote playback command issuable by the caller (step G1). The remote playback command is also an identity code generated preferably by the touch tone phone. The DTMF circuitry conveys decoded touch tone signals to the CPU 36 which determines if the remote playback code issued corresponds to a remote playback code previously stored by the user in the same manner as the mailbox command.

When the remote playback command is not recognized, the CPU 36 maintains the tape drive assembly 62 in the recording mode for recording the caller's message on the currently selected track (step H1), while continuously monitoring the call for the remote playback command. The CPU 36 also monitors the output of the signal processing circuit 48 and the telephone interface circuit 34 for a message termination condition (step I1). Such a condition includes silence, extension phone pick-up, dial tones or a busy tone. The CPU allows recording to proceed until one of the aforementioned termination conditions occur. Thus, it is possible to limit message length based only on the amount of tape remaining. Since tracks are recorded independently of each other, messages on the first track 12 will not affect the length of messages on the second track 14. Alternatively, the CPU may optionally concurrently maintain a timing count to determine if a predetermined message time length has been reached. Furthermore, the CPU 36 monitors the tape drive assembly 62 for an output indicating that the end of the tape 10 has been reached. The CPU 36 performs a loop operation (steps G1–I1) executing the above monitoring operations to continuously check whether a message termination condition has occurred. If one of the above conditions occurs, the CPU 36 commands the telephone interface circuit 34 to effect an ON HOOK operation which signals the phone system, over the phone line 32, that the call is terminated (step J1). The CPU 36 then commands the tape drive assembly 62 to terminate a recording mode of operation. However, prior to the termination of recording, it is usually unavoidable that an unwanted recording such as a dial tone or other noise associated with the termination of the call is also made. Therefore, the CPU 36 commands the tape drive assembly to rewind the tape 10 a predetermined amount to back over the unwanted recording.

The CPU 36 is optionally equipped to invoke recording of a time and date stamp which is generated by the voice storage and synthesis circuit 56, at the end of the recorded message. The time and date stamp is an optional feature that is incorporated into selected embodiments of the present invention. A predetermined blank recording period is then made to indicate the end of the message. The CPU 36 then records the present tape count position in memory as the new end-of-message position count for subsequent repositioning of the tape for recording future messages (step L1). Following the completion of recording a "mailbox" message on the second track 14 in response to the mailbox command, the CPU resets the R/P coil selection switch 50 to the first track 12 and repositions the tape 10 to the end of the last normal message recorded on the first track 12 in preparation for the receipt of another phone call (step M1). The tape 10 is repositioned on the first track 12 by monitoring the tape position count, as discussed above, and comparing it with an end-of-message position count for the last recorded message on the first track 12, the normal message track. The repositioning is done at high speed by either fast forward or rewind modes. Thus, having re-positioned at the end of the last recorded message on the first track 12, permits the answering machine to respond rapidly to a subsequent receipt of normal messages, since the tape 10 is already in position for their receipt. If a just recorded message was a normal message, no repositioning is necessary as the tape 10 is already positioned at the end of the just recorded message on the first track 12.

When the tape 10 is in the correct position for recording a subsequent normal message, the CFU 36 commands the tape drive assembly 62 to terminate tape transport (step N1). The program then ends and returns to its beginning (Start) and awaits a receipt of a subsequent phone call.

During the process of recording a message, the CPU 36 continuously monitors an output of the DTMF circuitry of the signal process circuitry 48 for an indication that a remote playback command has been received (steps G1, H1, and I1). It is clear that such an operation may be accomplished by the CPU 36 repeatedly reading the output of signal processing circuitry, or by the signal processing circuitry sending an interrupt signal to the CPU 36 after which the CPU reads the output. When the signal processing circuitry 48 indicates that a command has been received, the CPU 36 verifies that the command matches the code previously stored by the user for security purposes. If the command matches, the CPU 36 continues to examine the output of the signal processing circuitry 48 for receipt of the mailbox command or a normal message command (step O1). After receiving a mailbox command or a normal message command, the CPU 36 will instruct the tape drive assembly 62 to rewind the tape 10 at high speed to a beginning of the tape 10 (step V1 or Q1 respectively). Similarly, if no subsequent command is received within a predetermined time period, or an incorrect mailbox command is received, the CPU 36 proceeds rewind the tape 10 to the beginning (step Q1) to play back the first track 12. An alternative embodiment of the present invention includes the use of two remote commands, a first one of which is for the playback of mailbox messages while the second is for the playback of normal messages. This allows the user to send only one remote command to playback either of the two types of messages on the first and second tracks, 12 and 14.

After the tape 10 is rewound, the CPU sets the R/P coil selection switch 50 to a position selecting the first R/P coil 18 for playing back messages on the first track 12 when either the normal message command, an incorrect mail message command, or no command is received (step Q1). Alternatively, the switch 50 is set for playback of the second flack 14 if a correct mailbox command is received (step W1). The CPU next proceeds to playback the messages on the track selected by the R/P coil selection switch 50 (steps X1 and R1). Since the messages are recorded sequentially, continuous playback is achieved without the need to search a tape for message locations. During playback, the first and second switches, 40 and 44, are set to their OUT positions and the tape drive assembly 62 is actuated to advance the tape 10 in the first direction 28 at playback speed. While playback proceeds, the CPU 36 monitors the output of the signal processing circuitry 48 to determine if any one of a variety of other remote commands is subsequently received (steps Y1 and S1). Such remote commands include commands for fast forwarding, rewinding, stopping the tape advance, saving messages, and canceling message playback. The aforementioned commands are effected by additional steps (not shown) which are realizable by those skilled in the art having viewed this disclosure.

After each recorded message on a the selected track has been played back, the CPU 36 stops the tape drive assembly 62 (steps T1 and Z1 ). As discussed above, the CPU 36 recognizes an end of the recorded messages by examining the tape position count in comparison with the stored end of message count. Verification of the end of the messages is optionally made by verifying silence via the signal processing circuitry 48. Absent receipt of a subsequent command signal during a predetermined time period, the CPU 36 instructs the telephone interface circuit 34 to effect an ON HOOK operation terminating the phone call and returns to the beginning of the program (START) to await a new phone call. However, if a command signal is received, such as a command to play the previously non-selected track, the CPU 36 does not issue an ON HOOK instruction and proceeds to execute steps (not shown) directed to effect the command received. For instance, if a command to playback the non-selected track was received, the CPU 36 would proceed to rewind the tape 10 and repeat the above operations selecting an appropriate one of the first and second tracks, 12 and 14 (steps P1 or V1).

The embodiment of the present invention discussed above provides an answering machine which is capable of functioning as a standard answering machine, while also providing an option for mailbox operation. The answering machine is programmed such that the mailbox mode of operation can be transparent to a caller unless a specific menu provision is implemented by the voice storage and synthesis circuit 56. Whereas dedicated voice mail systems require a caller to input specific codes using a touch tone phone, the above embodiment provides a default mode of operation wherein any caller can leave a message without going through the complexities of entering voice mail codes. Furthermore, should the caller be using a telephone that does not provide for touch tone operation, the caller can still leave a message on the first track 12 dedicated to normal message recording as opposed to voice mail recording. The above embodiment therefore allows a specific user to receive specific messages on the voice mail track, the second track 14, which is protected by a security code, while others expecting messages can receive the messages over the same phone line except that their messages are segregated from the voice mail messages. This feature is useful where, for instance, a user expects business messages to be received at his home while other family members also wish to receive recorded messages. Thus, the embodiment presented above provides a machine incorporating a voice mail feature while simultaneously providing the simplicity of use associated with conventional telephone answering machines.

Figure 4:
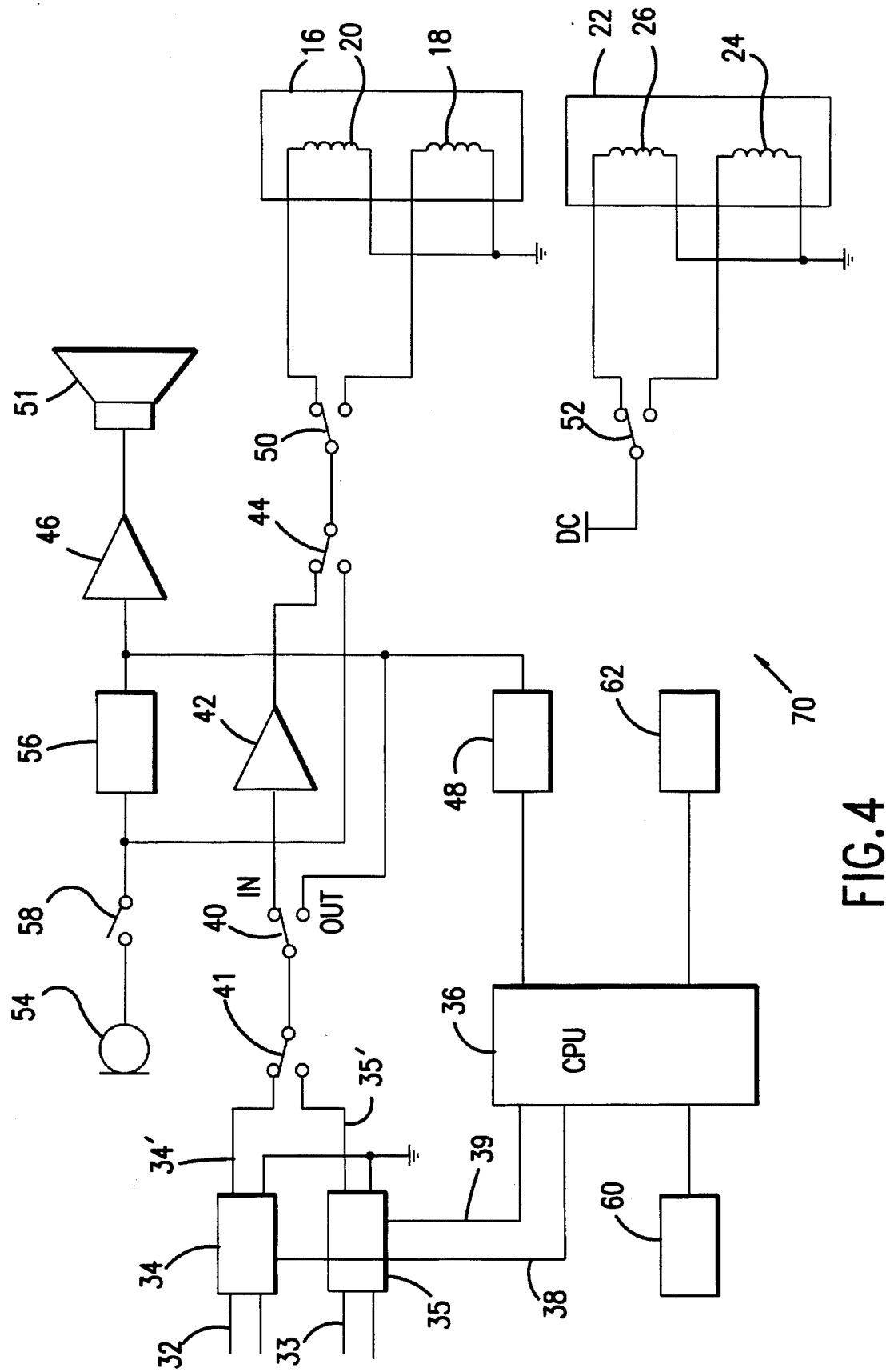
FIG. 4 is a schematic diagram of an electronic assembly of a second embodiment of the present invention.

Referring to FIG. 4, a schematic of an electronic assembly 70 of a second embodiment of the present invention is shown which incorporates a dual line answering feature. The electronic assembly is of similar construction, and functions in a similar manner, as the electronic assembly 30 of FIG. 2, except as follows. A second telephone interface circuit 35 interfaces with a second phone line 33 in addition to the first telephone interface circuit 34 interfacing with the first phone line 32. The second telephone interface circuit 35 is interfaced with the CPU 36 via a bus 39. A phone line selection switch 41 is operated by the CPU 36 to select either the first I/O port 34' of the first telephone interface circuit 34, or a second I/O port 35' of the second telephone interface circuit 35. The phone line selection switch 41 connects the selected I/O port with the first switch 40, which provides for the selection of incoming or outgoing message operation, as discussed above. During operation of the electronic assembly 30, the CPU 36 records messages received over the first and second phone lines, 32 and 33, on respective ones of the first and second tracks, 12 and 14, as discussed below. The remainder of the electronic assembly 70 is the same as the electronic assembly 30 of FIG. 2, however, the CPU 36 includes programming for implementing dual phone line operation as described below.

Figure 5:
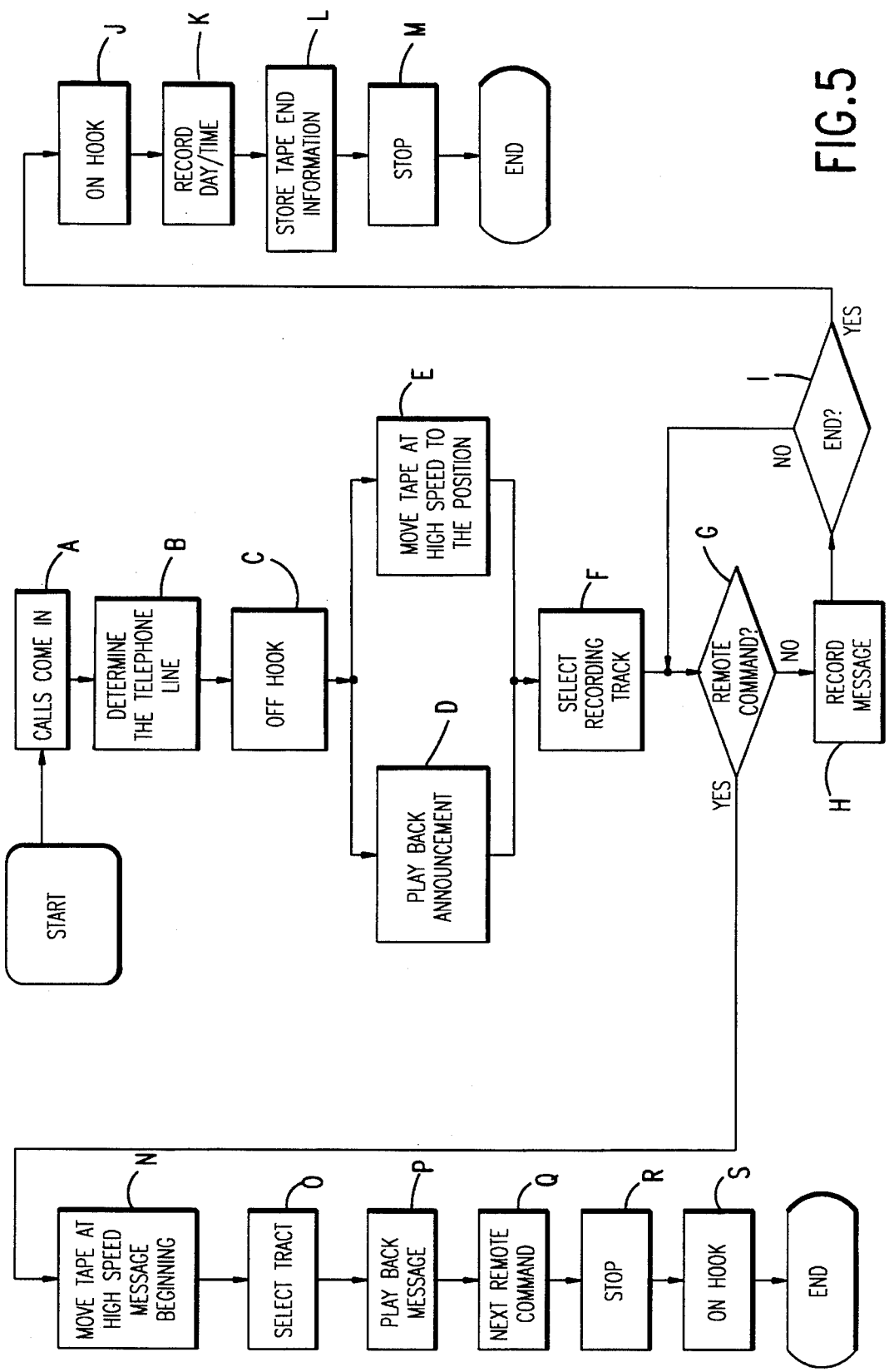
FIG. 5 is a flowchart of an embodiment of a program for controlling operation of the electronic assembly of FIG. 4.

Referring to FIG. 5, a flowchart details a program stored In the memory of the CPU 36 for operating the above answering machine embodiment having the dual phone line feature. The program operates the electronic assembly 70 in a manner similar to the program of FIG. 3 operation of the electronic assembly 30 as far as basic operations are concerned. These basic operations include setting the first and second switches, 40 and 44, to invoke record and playback modes, determining a position of a last recorded message, finding a last recorded message, and operating the voice storage and synthesis circuit 56. Therefore, in the interest of simplicity, redundant descriptions of such intricate operations are omitted from the following description.

Program execution begins when a telephone call arrives over one of the first and second phone lines, 32 and 33. The telephone call is processed by a respective one of the first and second telephone interface circuits, 34 and 35, which communicates to the CPU 36 that a ting signal is being received (step A). The CPU 36 proceeds to count a predetermined number of ting signals while determining which one of the first and second telephone interface circuits, 34 and 35, is receiving the phone call (step B) and sets the phone line selection switch 41 to connect the receiving telephone interface circuit to the first switch 40. The CPU 36 then issues an OFF HOOK command to the receiving telephone interface circuit when the user does not answer the telephone call before the predetermined number of ting signals (step C).

Following the issuance of the OFF HOOK command, the CPU 36 then initiates the playing of an announcement message by the voice storage and synthesis circuit 56. The announcement message may be one specially recorded for the active phone line or it may be a universal message for both phone lines, 32 and 33. Simultaneously, the CPU 36 repositions the tape 10 to the end-of-message position of a target track of the tape 10 (step E). The target track is the first track 12, if the first telephone interface circuit 34 is the receiving circuit, or the second track 14, if the second telephone interface circuit 35 is the receiving circuit. However, if the target track is a track presently selected by the R/P coil selection switch 50, repositioning is not necessary because the tape 10 is positioned by default at the end of a last recorded message. The CPU 36 then sets the R/P coil selection switch 50 to select the target track (step F).

Once the target track has been selected, the CPU 36 then checks the output of the signal processing circuit 48 to determine if a remote playback command has been received (step G). If a remote playback command is received from the caller, the CPU 35 initiates execution of a series of operations to playback prior recorded messages (steps N–S). Alternatively, when no command is received from the caller, the CPU 36 proceeds to set the electronic assembly 70 to the record mode, wherein the incoming call is recorded on the target track (step H). Once the record mode is set, the CPU 36 monitors the output of the signal processing circuitry 48 and the receiving telephone interface circuit for the occurrence of one of the message termination conditions discussed above with reference to FIG. 3 (step I). Continuous monitoring for either a message termination condition or a remote playback command is effected by the CPU 36 in a loop operation executing the required checks (steps G–I). Upon detecting one of the end of message conditions, the CPU 36 executes in sequence operations to issue an ON HOOK signal (step J), optionally record a time and date stamp (step K), store an end-of-message position for the selected track (step L), and terminate operation of the tape drive assembly 62 (step M).

The CPU 36 responds to a receipt of a remote playback command by repositioning the tape 10 at high speed to the beginning of the messages (step N), i.e. the beginning of the tape 10. The CPU 36 next sets the R/P coil selection switch 50 to an appropriate one of first and second track positions according to the remote playback command received (step O). For instance, a caller calling on the first phone line 32 can issue a command to playback messages on the second track 14 which were received over the second phone line 33, or vice versa. Alternatively, the CPU 36 is programmed to lock out callers from playing back messages on a track not corresponding to the line they are calling on. After the R/P coil switch 50 is set, CPU 36 begins playback of the selected track (step P), while concurrently monitoring the signal processing circuit 48 for the arrival of the other possible remote commands discussed above with reference to the first embodiment. When the message ends or a predetermined time has passed, the CPU 36 stops the operation of the tape drive assembly 62 and issues an ON HOOK command to the receiving telephone interface circuit. Following issuance of the ON HOOK command, the program sequence (steps N–S) ends and the program returns to the starting point, ready to handle a receipt of a new phone call.

A third embodiment of an answering machine of the present invention utilizes the electronic assembly 70 shown in FIG. 4 with the exceptions noted below and incorporates the programming features of the above first and second embodiments of the present invention shown in FIGS. 3 and 5. The answering machine differs from the above embodiments in that the tape 10 has a third and a fourth track (not shown), the R/P head 16 has third and fourth coils (not shown), and the erase head 22 has third and fourth erase coils (not shown). The R/P coil selection switch 50 is a single pole four throw switch, instead of the single pole double throw switch of FIG. 4. The erase coil select switch 52 is similarly replaced by a single pole four throw switch. The first and second tracks, 12 and 14, accept normal message recordings from the first and second phone lines, 32 and 33. The third and fourth tracks function to accept mailbox messages arriving over the first and second tracks, 12 and 14, respectively. The programming incorporates the features of the flowchart of FIG. 5 for determining which one of the phone lines, 32 and 33, is active (steps A–C) followed by the features of the flowchart of FIG. 3 (C1–D1) for checking for the mailbox command and for the remaining details of operation with the following exceptions. Both the first and second tracks, 12 and 14, are treated as normal message tracks for their respective phone lines. As noted above, the third track is treated as the mailbox track for the first track 12 and the fourth track is treated as the mailbox track for the second track 14. After an incoming message is recorded, the tape 10 is rewound to the end of the last message recorded on one of the first and second tracks, 12 and 14. Thus, the answering machine can handle two phone lines, 12 and 14, and provide mailbox operation for both.

Having described preferred embodiments of the invention with reference to the accompanying drawings, it is to be understood that the foregoing explanation is illustrative and that the invention is not limited to those precise embodiments. Various alterations and modifications may be effected therein by one skilled in the art without departing from the scope or spirit of the invention as defined in the appended claims.

What is claimed is:

1. An apparatus for answering phone calls and recording messages on a single tape comprising:

a controller;

interface means for interfacing with a first and a second phone line and said controller, responsive to phone line conditions and said controller;

recording means responsive to said controller for recording messages received over said first phone line on a first track of said single tape, and recording messages received over said second phone line on a second track of the single tape;

announcement means responsive to said controller for generating an announcement message;

said controller including means for selectively sending said announcement message out over one of said first and second phone lines in response to a predetermined number of ring signals indicated by said interface means;

said controller including means for actuating said recording means to record a phone message, received over one of said first and second phone lines, on one of said first and second tracks, respectively; and said controller including means for terminating recording responsive to one of an indication of termination of said phone message and a passage of a predetermined time period.

2. The apparatus of claim 1 wherein said recording means records messages on said first and second track in an identical direction.

3. The apparatus of claim 1 further comprising said controller means including:

means for detecting an end of a last recorded message on each of said first and second track; and means for returning said tape to a position corresponding to the end of the last recorded message on one of said first and second tracks upon termination of recording.

4. The apparatus of claim 1 further comprising said controller means including means for playing messages recorded on one of said first and second tracks responsive to a receipt of a predetermined remote playback command received over said one of said first and second phone lines.

5. The apparatus of claim 4 wherein said predetermined remote playback command includes a first remote playback command operative only for playing back messages on said first track and a second remote playback command operative only for playing back messages on said second track.

6. The apparatus of claim 8 further comprising:

a microphone;

means responsive to said controller for applying an output of said microphone to one of said recording means and said interface means; and said controller including means responsive to receipt of a remote monitoring command received over an active one of said first and second phone lines for one of recording said output of said microphone on one of said first and second tracks, and transmitting said output of said microphone over said active phone line.

7. The apparatus according to claim 1 further comprising:

said recording means further including means for recording messages on a third and a fourth track of the single tape;

said controller including means for actuating said recording means to record a phone message on said third track in response to receiving a first predetermined code received over said first phone line, and on said fourth track in response to receiving a second predetermined code received over said second phone line; and said controller including means for actuating said recording means to record said phone message on said first track in response to passage of a second predetermined time period without a receipt of said first predetermined code received over said first phone line, and on said second track in response to passage of said second predetermined time period without a receipt of a second predetermined code received over said second phone line.

8. An apparatus for answering phone calls and recording messages on a single tape comprising:

a controller;

interface means for interfacing with a first and a second phone line and said controller, responsive to phone line conditions and said controller;

recording means, responsive to said controller, for recording messages received over said first and second phone lines on a single tape on respective ones of first and second tracks in a single direction;

said controller including means for actuating said recording means to record a phone message, received over one of said first and second phone lines, on said single tape; and said controller including means for terminating recording responsive to one of an indication of termination of said phone message and a predetermined time period.

* * * * *